(12) United States Patent
Sugimoto

(10) Patent No.: US 6,934,545 B2
(45) Date of Patent: Aug. 23, 2005

(54) MOBILE COMMUNICATION TERMINAL APPARATUS, CONTROL CIRCUIT, AND HANDOFF CONTROL METHOD

(75) Inventor: Yoshihiro Sugimoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 512 days.

(21) Appl. No.: 09/951,738

(22) Filed: Sep. 14, 2001

(65) Prior Publication Data
US 2002/0039901 A1 Apr. 4, 2002

(30) Foreign Application Priority Data
Oct. 2, 2000 (JP) ........................................ 2000-302707

(51) Int. Cl.$^7$ ................................................ H04Q 7/20
(52) U.S. Cl. ........................ 455/436; 455/439; 370/331
(58) Field of Search ................................. 455/436, 437, 455/439, 442, 450, 513, 502, 440; 370/330, 331

(56) References Cited

U.S. PATENT DOCUMENTS 6,507,572 B1 * 1/2003 Kumar et al. ............... 370/335
6,721,564 B1 * 4/2004 Kobayashi ................... 455/436
6,728,540 B1 * 4/2004 DeSantis et al. ............. 455/437
6,745,032 B1 * 6/2004 Alvesalo et al. ............. 455/436

* cited by examiner

Primary Examiner—CongVan Tran
(74) Attorney, Agent, or Firm—Oblon, Spivak, McClelland, Maier & Neustadt, P.C.

(57) ABSTRACT

There is disclosed an apparatus newly including a handoff request additional transmission control function. According to the handoff request additional transmission control function, when a procedure shifts to a retransmission procedure of a handoff request message A, a usable sequence number (SEQ2) other than a sequence number (SEQ1) for use in transmission of the art message A is selected, Subsequently, the sequence number (SEQ2) is used to transmit the message A having the same content as that of the aforementioned message in a retransmission interval period of the message A in which the sequence number (SEQ1) is used.

21 Claims, 12 Drawing Sheets

MOBILE COMMUNICATION TERMINAL APPARATUS, CONTROL CIRCUIT, AND HANDOFF CONTROL METHOD

CROSS-REFERENCE TO RELATED APPLICATIONS

This application is based upon and claims the benefit of priority from the prior Japanese Patent Application No. 2000-302707, filed Oct. 2, 2000, the entire contents of which are incorporated herein by reference.

BACKGROUND OF THE INVENTION

1. Field of the Invention

The present invention relates to a mobile communication terminal apparatus having a function of requiring, for example, handoff of a base station, a control circuit of the apparatus, and a handoff control method in a cellular mobile communication system.

2. Description of the Related Art

In recent years, a cellular mobile communication system has rapidly spread. In the cellular mobile communication system, a plurality of base stations are scattered/disposed in a service area and these base stations form respective radio zones called cells. Moreover, the mobile communication terminal apparatus is connected to a base station of the radio zone in which the terminal apparatus exists over a radio channel, and the base station is connected to the terminal apparatus of a communication destination via a communication network. This realizes communication among the terminal apparatuses.

In this type of system, when the mobile communication terminal apparatus moves between the radio zones during waiting or communicating, handoff is performed. A handoff operation will be described hereinafter by means of an example of a system in which a code division multiple access (CDMA) method is employed.

The CDMA mobile communication terminal apparatus measures a reception level of a pilot signal transmitted from the base station which is establishing synchronization during waiting or communicating. Moreover, the respective reception levels of the pilot signals transmitted from a plurality of base stations (neighboring base stations) disposed around the base station which is establishing the synchronization are also measured. A strength of the reception level is represented by a ratio (Ec/Io) of a whole reception energy (Io) of the pilot signal after inverse spread to an energy (Ec) of the pilot signal arriving from the base station as a measurement object. Moreover, when the reception level of the pilot signal arriving from the neighboring base station has a strength of a predetermined level or more strength, the following determinations are performed. In one determination, it is determined whether or not a strength $(Ec/Io)_{PNa2}$ of the reception level of a pilot signal PNa2 arriving from the base station establishing the synchronization is less than a value designated by the base station. In the other determination, it is determined whether or not a strength $(Ec/Io)_{other}$ of the reception level of each pilot signal arriving from a remaining base station is more than another value designated by the base station. Moreover, when answers to these determinations are both affirmative, a handoff request message called a pilot strength measurement message (PSMM) is generated and transmitted to the base station establishing the synchronization. In this handoff request message, the reception level of the pilot signal arriving from the base station which is establishing the synchronization, and the reception levels of the respective pilot signals arriving from the respective neighboring base stations are inserted.

On the other hand, on receiving the handoff request message from the mobile communication terminal apparatus, the base station determines a base station as a handoff destination based on the reception level inserted in the message. Moreover, a notice of a name of the base station as the determined handoff destination is transmitted to the mobile communication terminal apparatus which requires handoff. On receiving the notice, the mobile communication terminal apparatus first returns the response message indicating the acknowledgment to the base station. Subsequently, the base station as a synchronization destination is switched in response to the notice. A handoff processing of the mobile communication terminal apparatus is performed in this manner.

Additionally, this type of conventional system has the following problems to be solved. That is, when the mobile communication terminal apparatus transmits the handoff request message, the apparatus waits for a return of an acknowledgment response message from the base station. Moreover, when the acknowledgment response message is not returned within a given time, a quality of the radio channel is determined to be temporarily deteriorated. Subsequently, the base station repeats transmission of the handoff request message by a predetermined number of times (e.g., nine times at maximum). That is, a retransmission procedure of the handoff request message is executed. FIG. 12 shows one example of the sequence. In FIG. 12, (SEQ1(1)) indicates a first transmission of a sequence number "1", and (SEQ1(2)) indicates a second transmission of the sequence number "1".

However, a retransmission time interval in the retransmission procedure is determined by a standard for each system. For example, the interval is set to 400 msec or more in the CDMA system defined by IS-95. Therefore, transmission frequency of the handoff request message by the retransmission procedure is reduced, Therefore, a long period of time is sometimes required from when the retransmitted message reaches the base station until handoff is actually executed.

In general, when the handoff request message is transmitted, the communication state with the base station is generally bad in many cases. In this case, the message cannot easily be transmitted to the base station from the mobile communication terminal apparatus. When the mobile communication terminal apparatus moves at a high speed in the communication state, the mobile communication terminal apparatus moves along a considerably long distance during a period of message retransmission to the base station from the mobile communication terminal apparatus. In this case, the content of the message having reached the base station turns to old information. When the base station determines the handoff destination based on the old information, an inappropriate base station is designated as the handoff destination. Moreover, as a result, handoff failure is disadvantageously generated.

BRIEF SUMMARY OF THE INVENTION

An object of the present invention is to substantially reduce a transmission interval of a message and enhance a transmission frequency of the message in a transmission and retransmission procedure of the message. Another object is to provide a mobile communication terminal apparatus, control circuit, and handoff control method in which the message can quickly be notified to a base station even daring deterioration of a radio environment.

According to an aspect of the present invention, a first message for requiring a predetermined processing of the base station is generated, and a usable first sequence number is selected from a plurality of sequence numbers. Moreover, the selected first sequence number is used to transmit the generated first message to the base station. Furthermore, it is monitored whether or not an acknowledgment response arrives from the base station within a predetermined period from a transmission timing of the first message. Additionally, if the acknowledgment response does riot arrive from the base station within the predetermined period, the first sequence number is used to retransmit the first message. Furthermore, a usable second sequence number is selected from the plurality of sequence numbers, and the selected second sequence number is used to transmit the second message having the same content as that of the first message to the base station at a timing which is different from transmission and retransmission timings of the first message.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION (First Embodiment)

Figure 1:
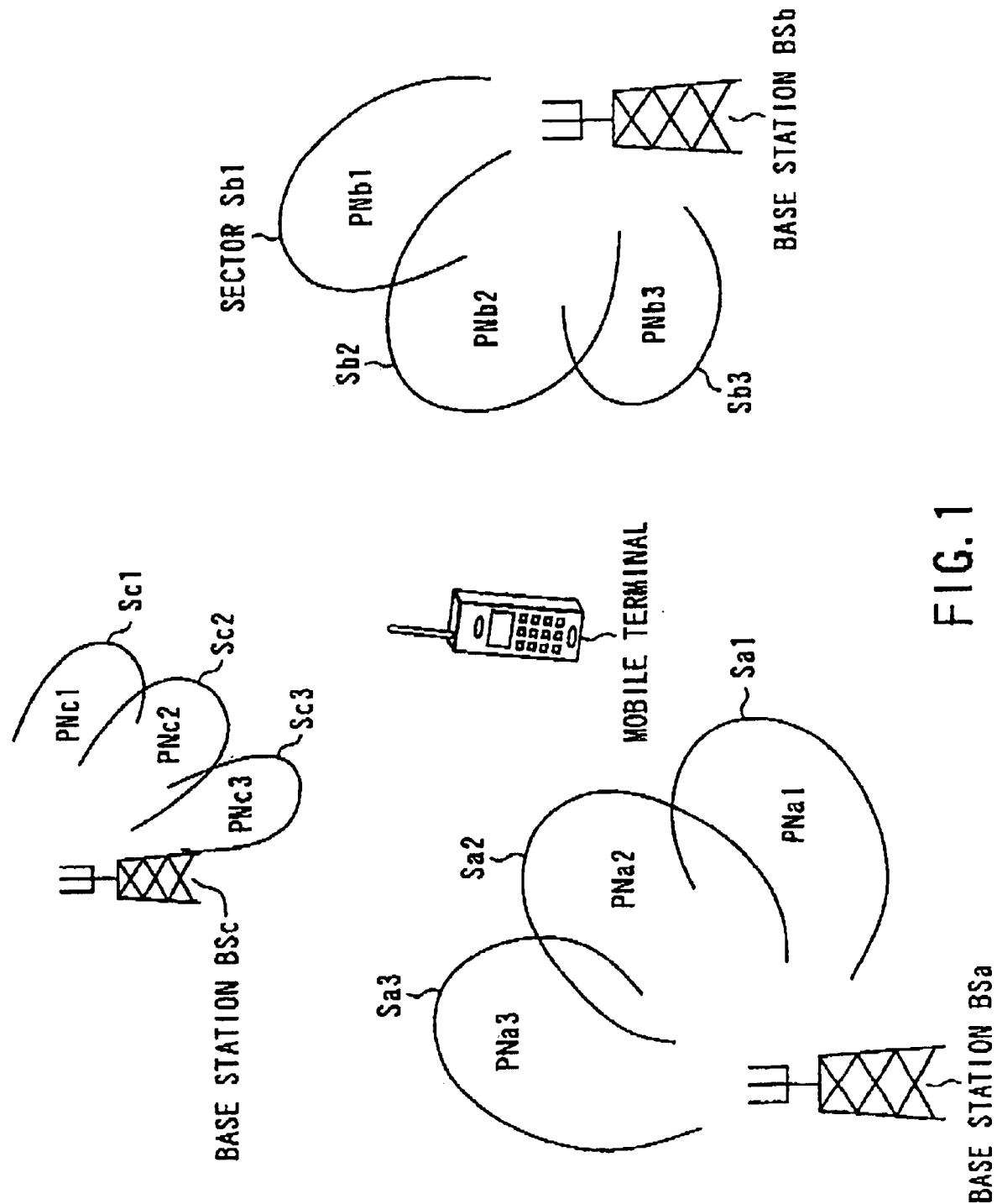
FIG. 1 is a schematic constitution diagram showing a CDMA mobile communication system according to a first embodiment of a cellular mobile communication system according to the present invention.

FIG. 1 is a schematic constitution diagram of a CDMA mobile communication system according to a first embodiment of a cellular mobile communication system according to the present invention.

In a service area of the system, a plurality of base stations BSa, BSb, BSc, . . . (only three stations are shown in FIG. 1) are scattered/disposed. These base stations BSa, BSb, BSc, . . . broadcast pilot channels PNa1 to PNa3, PNb1 to PNb3, PNc1 to PNc3 using spread codes whose offset values differ with respective sectors Sa1 to Sa3, Sb1 to Sb3, Sc1 to Sc3, respectively. Additionally, a pseudo noise code and orthogonal code are used together as the spread code. For example, Walsh sequence and Orthogonal Gold sequence are used as the orthogonal code. The reason why the orthogonal code is used is that orthogonality among the channels is enhanced and interference is further inhibited.

A mobile terminal MS establishes synchronization with respect to any one of the pilot channels PNa1 to PNa3, PNb1 to PNb3, PNc1 to PNc3 broadcast by the base stations BSa, BSb, BSc, . . . To perform communication with a satisfactory quality, it is necessary to constantly establish the synchronization with respect to the pilot channel having a satisfactory reception quality. Therefore, handoff is performed during waiting in the mobile terminal MS.

In the handoff, the mobile terminal MS periodically compares the reception quality of the pilot channel which is establishing the synchronization with reception qualities of a plurality of other pilot channels with which the synchronization is prospectively established. Subsequently, the satisfactory pilot channel whose reception quality is not less than a predetermined level as compared with the pilot channel establishing the synchronization is found in a plurality of other pilot channels with which the synchronization is prospectively established. In this case, a synchronization establishment object is switched to the found pilot channel FIG. 2 is a circuit block diagram showing a constitution of the mobile terminal MS according to the first embodiment.

Figure 2:
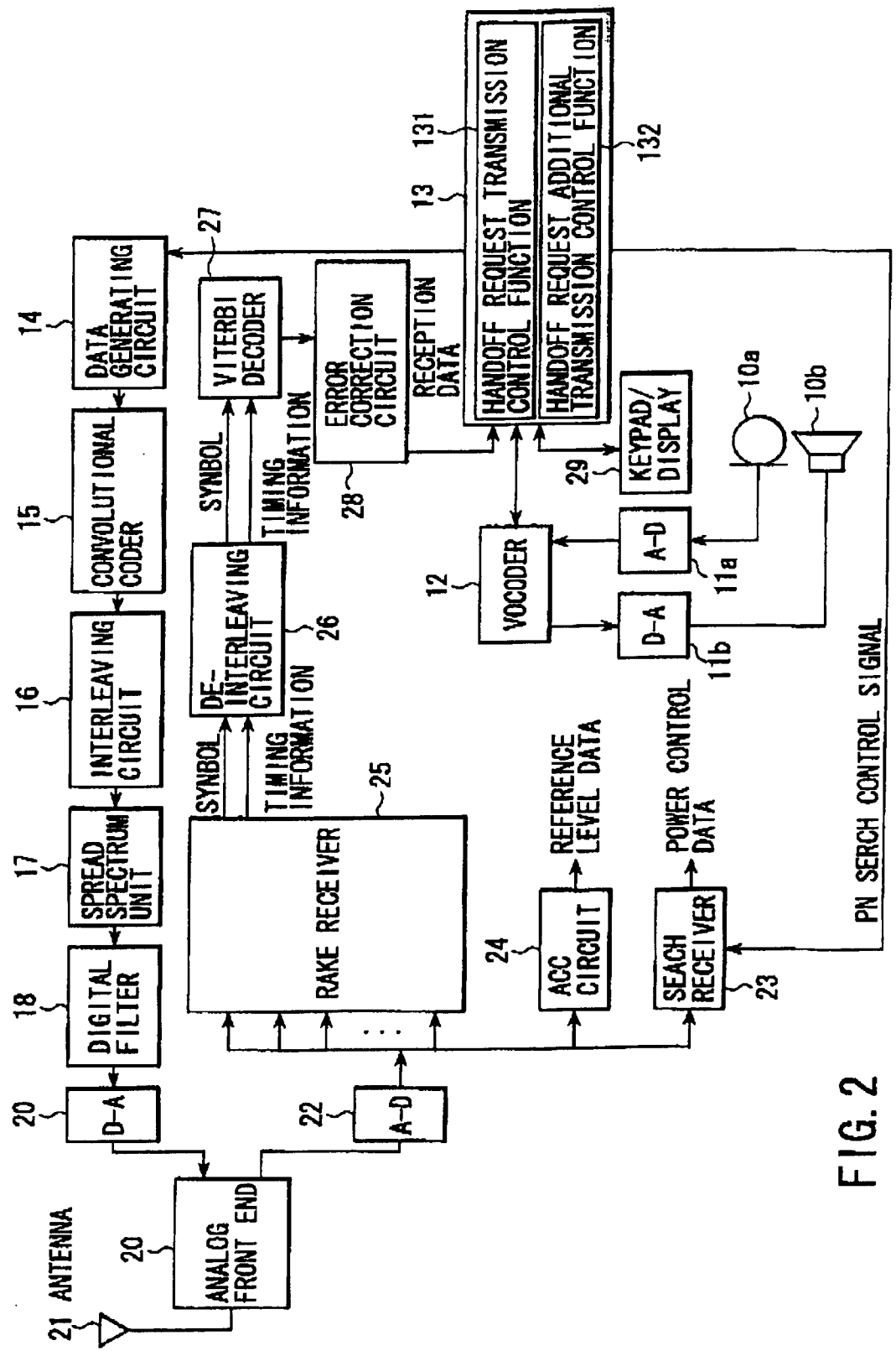
FIG. 2 is a circuit block diagram showing a constitution of a CDMA mobile communication terminal apparatus for use in the system shown in FIG. 1.

In FIG. 2, a transmission speech signal of a speaker outputted from a microphone 10a is converted to a digital signal by an analog-digital converter (A-D) 11a, and inputted to a voice coder-decoder (hereinafter referred to as a vocoder) 12. The vocoder 12 codes the speech signal by a multi rate speech coding system. For example, one rate is selected from four coding rates 9600 bps, 4800 bps, 2400 bps, 1200 bps, and the input digital speech signal is coded by the selected coding rate. The coding rate is indicated via a rate control signal from a microprocessor (MPU) 13.

The microprocessor (MPU) 13 adds a control signal, and the like to the coded digital speech signal outputted from the vocoder 12, and thereby generates transmission data. After an error detection code is added to the transmission data by a data generating circuit 14, the data is coded by a convolutional coder 15, and further subjected to a processing for interleave by an interleaving circuit 16. Subsequently, the transmission data outputted from the interleaving circuit 16 is subjected to spectrum spread by the spread code by a spread spectrum unit 17.

An unnecessary frequency component is removed from the spectrum spread transmission signal by a digital filter 18, and the signal is converted to an analog signal by a digital-analog converter (D-A) 19. Subsequently, the analog transmission signal is converted up at a predetermined radio frequency by an analog front-end 20, amplified in power at a predetermined transmission power level, and transmitted, for example, to the base station via an antenna 21.

On the other hand, a radio signal received by the antenna 21 is amplified by a low-noise amplifier in the analog front-end 20, and converted down at an intermediate frequency or a base-band frequency. Subsequently, the reception signal outputted from the analog front-end 20 is converted to the digital signal at a predetermined sampling period by an analog-digital converter (A-D) 22, and inputted to a search receiver 23, automatic gain control (AGC) circuit 24 and RAKE receiver 25.

The RAKE receiver 25 has a plurality of (e.g., four) finger circuits, and a symbol combiner in which phases of output signals of these finger circuits are matched and symbols are combined. Each finger circuit subjects the reception signal of one path allotted by the microprocessor 13 to inverse spectrum spread, and the reception signal of the path is separated from the radio signal and reproduced.

The search receiver 23 searches a PN code of the pilot channel broadcast by the base station, and captures offset. The receiver basically has the same constitution as that of the finger circuit, Power control data obtained by the search operation of the PN code is taken into the microprocessor 13.

A demodulation symbol outputted from the RAKE receiver 25 is inputted to a de-interleaving circuit 26 together with timing information, and subjected to a de-interleave processing by the de-interleaving circuit 26. Subsequently, the de-interleaved demodulation symbol is Viterbi-decoded in a Viterbi decoder 27. Furthermore, the Viterbi-decoded demodulation symbol is subjected to an error correction decoding processing by an error correction circuit 28, and resulting reception data is inputted to the microprocessor 13. The inputted reception data is separated into speech data and control data by the microprocessor 13. The speech data is decoded to speech signal by the vocoder 12, and converted to the analog signal by a digital-analog converter (D-A) 11*b*, and enlarged voice output is emitted from a speaker 10*b*.

Additionally, a keypad/display 29 is disposed for a user to input and set dial data, control data, and the like and to display various information regarding an operation state of the mobile terminal MS. An operation of the keypad/display 29 is controlled by the microprocessor 13.

Moreover, the microprocessor 13 has a handoff request transmission control function 131 and handoff request additional transmission control function 132 as new control functions according to the present invention.

A memory (not shown) is included in the microprocessor 13, and a program stored in the memory is executed by the microprocessor 13, so that the control functions are realized. The handoff control program may be stored beforehand in a ROM or another memory, but may be copied from a storage medium and stored during assembling of a product or after use start.

Examples of the storage medium include memories such as ROM including EEPROM and RAM, floppy disk, hard disk, optical disks such as CD-ROM disk and DVD disk, memory card, and another storage medium which can store other programs. Moreover, the handoff control program may be downloaded onto the mobile terminal MS from Internet or another computer network, or sites disposed on other networks, and stored in the memory.

In the handoff request transmission control function 131, a reception strength of each pilot channel broadcast by the base station which is establishing the synchronization, and a reception strength of each pilot channel broadcast by a neighboring base station as a prospective synchronization establishment object are measured, respectively. Moreover, it is determined based on a measured value whether or not handoff is necessary. When the necessity of the handoff is determined, a request message (PSMM) including the measured values of the reception strengths of the respective pilot channels is generated. Subsequently, a sequence number is used to transmit the PSMM to the base station which is establishing the synchronization. The sequence number is selected from unused sequence numbers among a plurality of prepared sequence numbers.

Moreover, after transmission of the PSMM, it is monitored whether or not the response message of acknowledgment is returned from the base station within a given time. Subsequently, when the message is not returned, the sequence number used for transmitting the PSMM is used to retransmit the PSMM. Thereafter, the same sequence number is used to repeat the retransmission of the PSMM until the response message of the acknowledgment is returned from the base station. Additionally, the number of repetitions is set to nine in IS-95 standard.

Furthermore, it is assumed that a new handoff request message is generated in a transmission state of a plurality of PSMMs in the same period. In this case, it is determined whether or not the number of PSMMs being transmitted reaches the upper-limit value. Subsequently, when the number does not reach the upper-limit value, the newly generated PSMM is transmitted. On the other hand, with the upper-limit value, the new handoff request message is set to the transmission standby state, until the acknowledgment to any one of PSMMs waiting for the acknowledgment response is received.

In the handoff request additional transmission control function 132, one or a plurality of unused sequence numbers different from the sequence number used in the transmission of PSMM are newly selected from the plurality of prepared sequence numbers. Subsequently, one or a plurality of newly selected sequence numbers are used to additionally transmit the PSMM having the same content as that of the PSMM transmitted by control of the handoff request transmission control function 131 to the base station which is establishing the synchronization. The additional transmission timing is set to a retransmission interval period of each PSMM after the PSMM retransmission procedure is started by the control of the handoff request control function 131.

An operation of the mobile terminal MS constituted as described above will next be described.

It is now assumed that the mobile terminal MS having the established synchronization with respect to the pilot channel PNa2 transmitted by the base station BSa has moved in a direction of the base station BSb.

Figure 3:
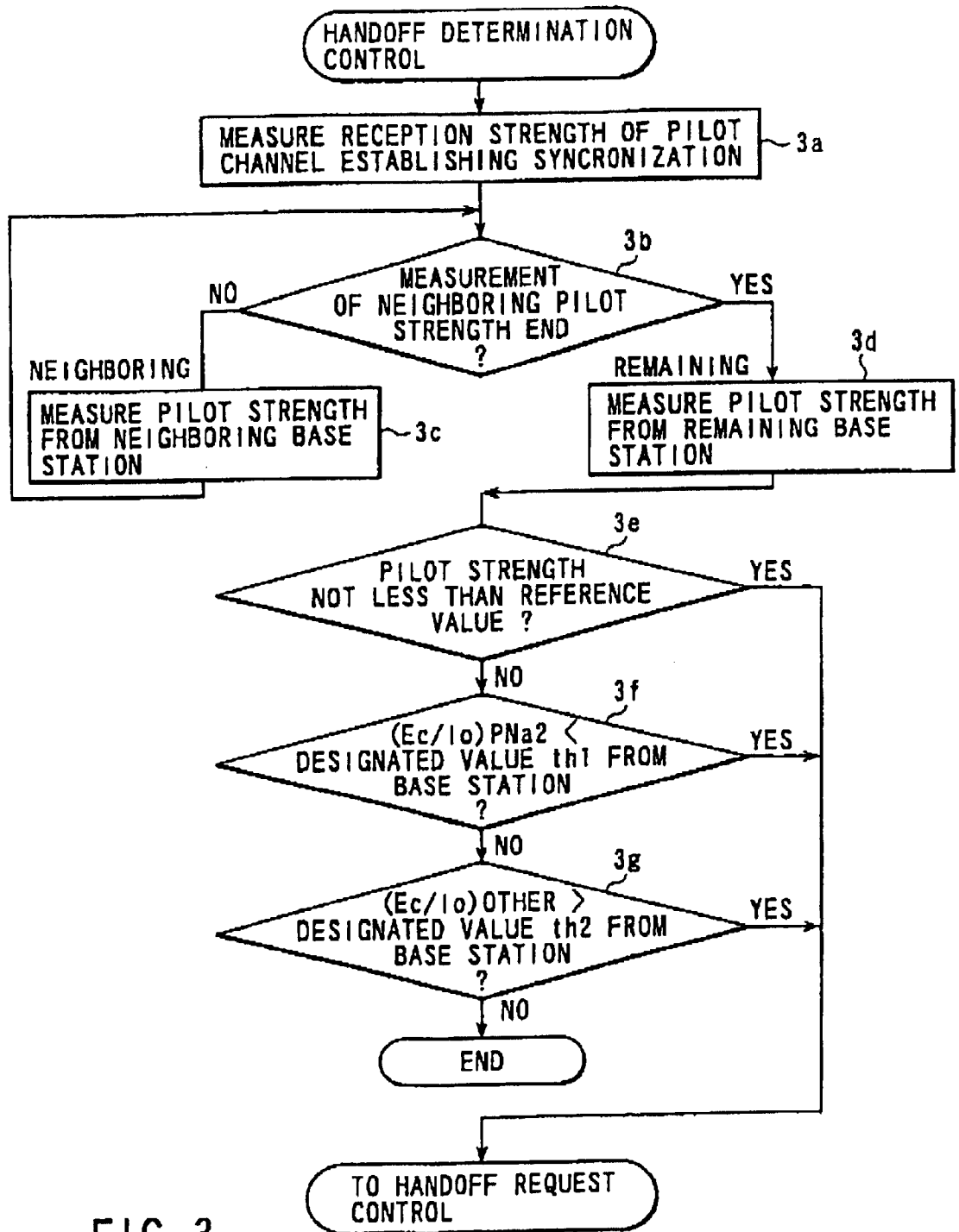
FIG. 3 is a flowchart showing a procedure of handoff determination control executed in the mobile communication terminal apparatus shown in FIG. 2, and the content of the control.

In this case, the mobile terminal MS determines whether or not the handoff is necessary as follows. FIG. 3 is a flowchart showing a control procedure and control content.

That is, first in step 3a, the mobile terminal MS measures a reception strength $(Ec/Io)_{PNa2}$ of the pilot channel PNa2 which is establishing the synchronization. Moreover, it is determined in step 3b whether or not measurement of the reception strength of each pilot channel broadcast by neighboring base station BSb, BSc is ended. Subsequently, when the measurement is not ended, in step 3c the pilot channel PNa establishing the synchronization successively receives the pilot channels of the neighboring base stations BSb, BSc and measures the reception strengths in accordance with a neighbor list message notified from the base station BSa. The neighbor list message includes an identification number of a PN code for use by a plurality of neighboring base stations.

On ending measurement of received electric field strengths from the neighboring base stations BSb, BSc, next in step 3d the reception strength of the pilot channel from a remaining base station is measured. The remaining base station is obtained by excluding the base station establishing the synchronization and the neighboring base station from all the base stations which can be identified by the PN code. The mobile terminal MS does not necessarily have to measure the reception strengths of the pilot channels transmitted by all the remaining base stations, and may measure only some of the reception strengths.

On ending the aforementioned measurement, the mobile terminal MS determines in the next step 3e whether or not there is a pilot channel having a measured value (Ec/Io) of the reception strength equal to or more than a reference value among the pilot channels from the neighboring base station and remaining base station having the reception strengths measured. Subsequently, the pilot channel whose measured value is not less than the reference value is found, and the processing then shifts to handoff request control.

On the other hand, the pilot channel whose measured value of the reception strength is not less than the reference value is not found in the step 3e, and the processing then shifts to step 3f. Moreover, when a reception strength $(Ec/Io)_{PNa2}$ of the pilot channel PNa2 establishing the synchronization is less than a threshold value thl designated by the base station, the processing also shifts to the handoff request control. Furthermore, when a reception strength $(Ec/Io)_{other}$ of each pilot channel from the remaining base station is more than another threshold value th2 designated by the base station, the processing also shifts to the handoff request control from step 3g. Additionally, in other cases, the handoff request control is not performed.

Figure 4:
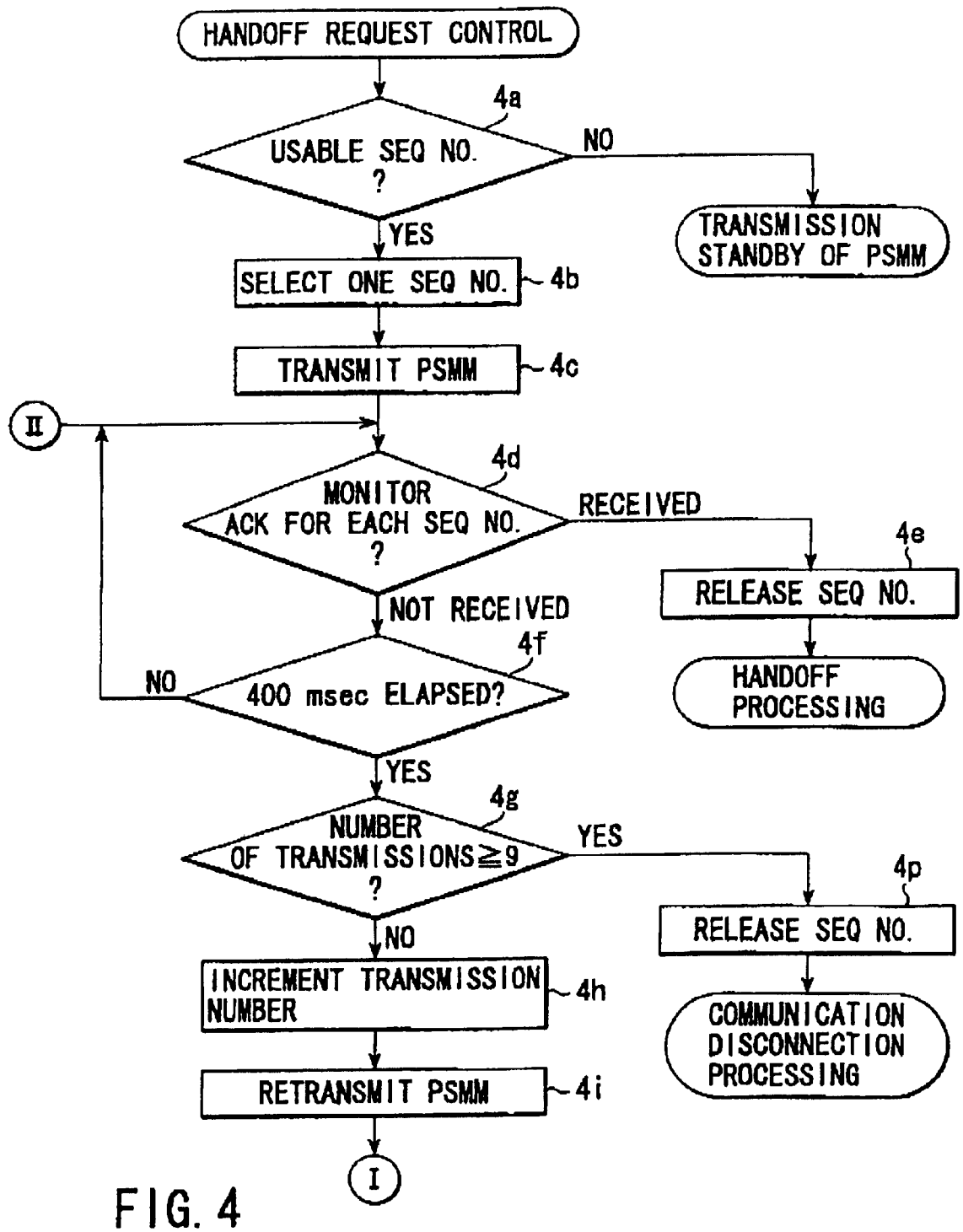
FIG. 4 is a flowchart showing a procedure of a former half of handoff request control in the first embodiment of the present invention, and the content of the control.
Figure 5:
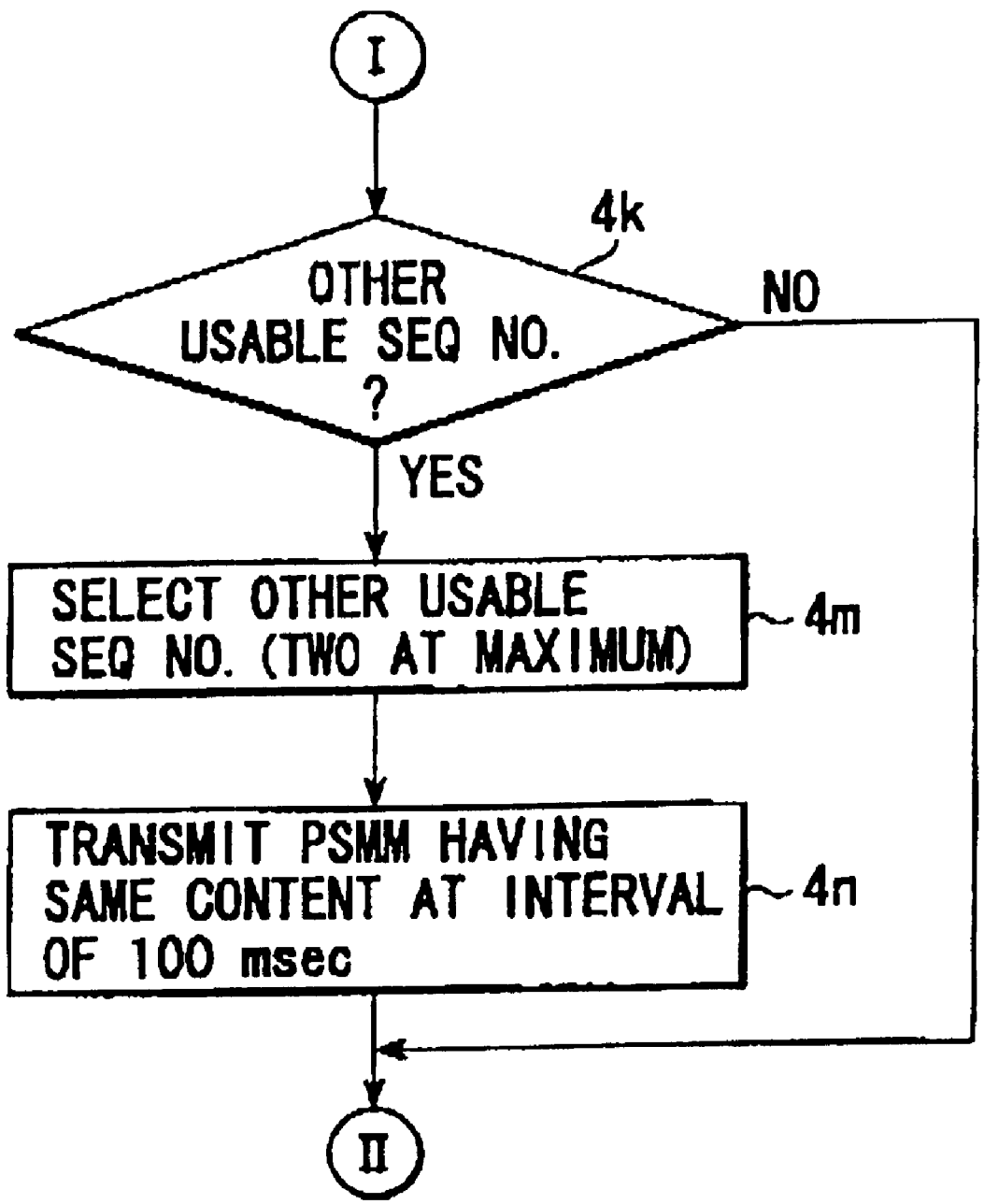
FIG. 5 is a flowchart showing a procedure of a latter half of the handoff request control in the first embodiment of the present invention, and the content of the control.
Figure 6:
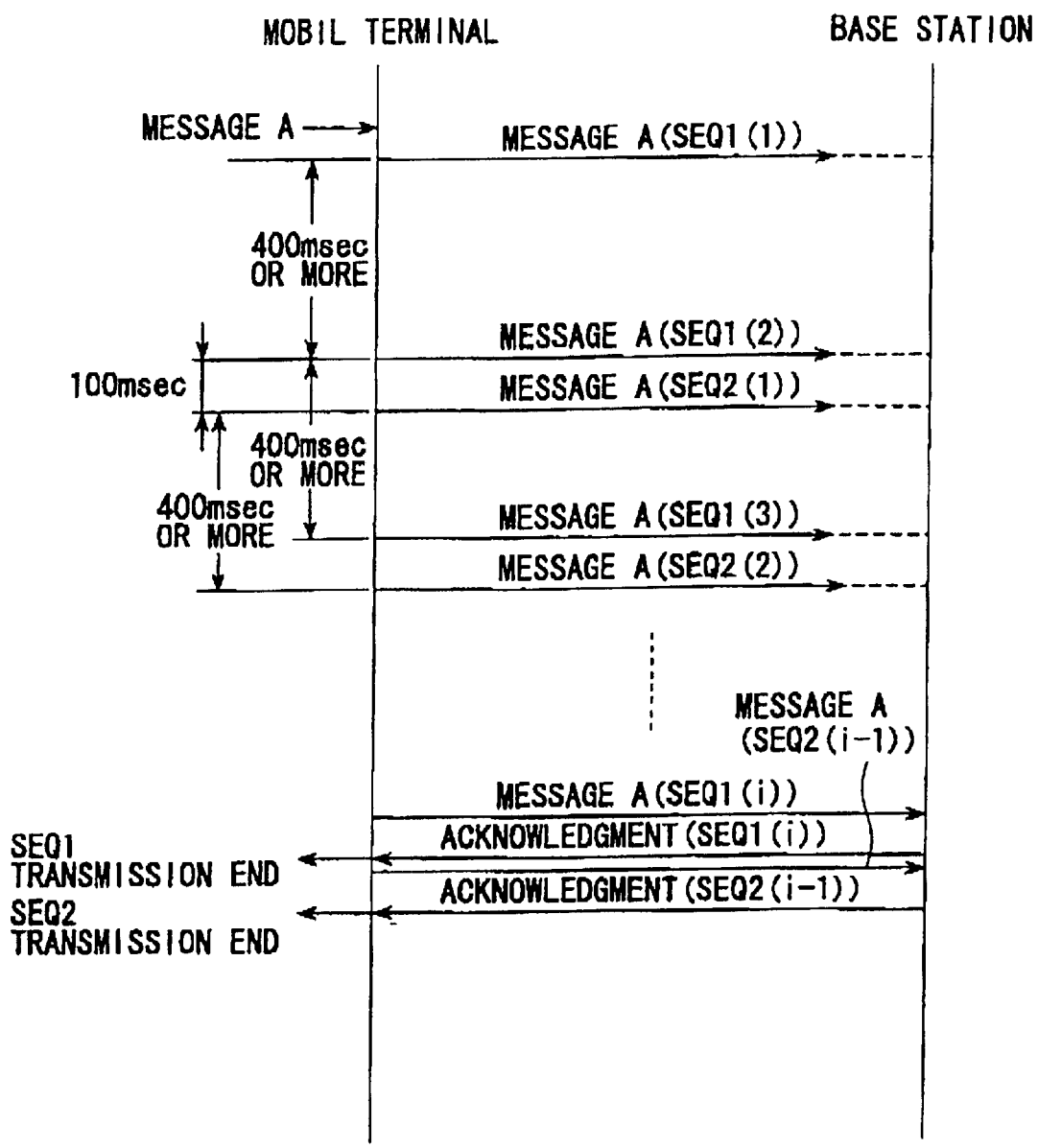
FIG. 6 is a sequence diagram showing a message transmission procedure in the first embodiment of the present invention.

Moreover, on shifting to the handoff request control, the mobile terminal MS executes the handoff control as follows. FIGS. 4 and 5 are flowcharts showing a control procedure and control content, and FIG. 6 is a sequence diagram showing a message transmission procedure performed between the mobile terminal MS and the base station BS.

That is, the mobile terminal MS determines first in step 4a whether or not there is a usable sequence number (SEQNo). Here, the usable sequence number means an unused sequence number among the remaining sequence numbers excluding one sequence number prepared beforehand to transmit the request message other than the handoff request message. As a result of the determination, when there is no usable sequence number, the processing shifts to transmission standby control of the handoff request message.

On the other hand, when there is the usable sequence number, one usable sequence number, for example, (SEQ1) is selected in step 4b. Subsequently, in step 4c, a pilot strength measurement message (PSMM) is generated as a message for requiring the handoff. In the PSMM, the measured value of the reception strength of the pilot channel PNa2 establishing the synchronization, and the measured values of the reception strengths of all the pilot channels from the neighboring and remaining base stations, obtained in the handoff determination control, are inserted. Subsequently, the selected sequence number (SEQ1) is used to transmit the generated handoff request message (referred to as message A in FIG. 6) to the base station BSa which is establishing the synchronization. Additionally, in FIG. 6, (1) of (SEQ(1)) indicates a first transmission.

When the message A (SEQ(1)) is transmitted, the mobile terminal MS starts a timer. Next an step 4f, time-out (400 msec) of the timer is monitored, and in step 4d, return of acknowledgment response message (ACK) from the base station BSa is monitored. When the acknowledgment response message is returned from the base station BSa before the time-out of the timer, the sequence number (SEQ1) is released in step 4e, and the processing shifts to a handoff processing.

Additionally, in the handoff processing, first arrival of a handoff direction message (HOM) is waited for from the base station BSa. On receiving the handoff direction message, a handoff completion message (HCM) is returned. Thereafter, a processing is performed to establish the synchronization with respect to the pilot channel as a handoff destination indicated by the handoff direction message.

Moreover, it is assumed that a state of a radio transmission path with the base station BSa is deteriorated by an influence of movement of the mobile terminal MS or an influence of multi-path, and therefore the message A (SEQ(1)) does not reach the base station BSa, or the response message of acknowledgment from the base station BSa cannot be received.

Then, the mobile terminal MS confirms the time-out of the timer in the step 4f, shifts to step 4g, and determines in the step 4g whether or not the message A (SEQ1) can be retransmitted. For example, when the number of transmissions of the handoff request message is a predetermined number, for example, nine or less, the retransmission is determined to be possible. Subsequently, when the retransmission is possible, in step 4h a count value of a counter for counting the number of transmissions of the sequence number (SEQ1) is incremented to (SEQ1(2)). Subsequently, the processing shifts to step 4i, and in the step the terminal generates the message A (SEQ1(2)) having the same content as that of the message A (SEQ1(1)), and transmits the message A (SEQ1(2)) to the base station BSa which is establishing the synchronization.

Thereafter, every time the mobile terminal MS uses the sequence number (SEQ1) to retransmit the message A, the terminal monitors the return of the response message of acknowledgment from the base station BSa in the step 4d. Subsequently, when the response message of acknowledgment cannot be received within the period (40 msec) before the time-out of the timer, retransmission control of the message A by the steps 4d to 4i is repeated as described above. At the time the retransmission control is repeated a predetermined number of times, for example, nine times, the repetition ends. Additionally, at the end of the retransmission procedure, the sequence number (SEQ1) is released in step 4p.

Additionally, when the retransmission procedure of the handoff request message A is started, the mobile terminal MS of the first embodiment executes additional transmission control of the handoff request message A having the same content.

That is, when the mobile terminal MS retransmits the message A (SEQ1(2)) in the step 4i, the terminal shifts to step 4k shown in FIG. 5 to determine presence/absence of the usable sequence number. As a result of the determination, when the usable sequence number is not other than (e.g., one) sequence number prepared beforehand for transmission of another message, additional transmission is determined to be impossible. Subsequently, the processing returns to the retransmission control of the message A using the sequence number (SEQ1) by the steps 4d to 4i as it is.

On the other hand, it is assumed that the usable sequence number remains. In this case, one usable sequence number (SEQ2) is selected in step 4m, and the processing shifts to step 4n. Subsequently, in the step 4n, the selected sequence number (SEQ2) is used to transmit the message A having the same content as that of the message A to the base station BSa. Additionally, in this case, a transmission timing of the message A (SEQ2(1)) is set such that the message is transmitted 100 msec after transmission of the message A (SEQ1 (2)).

Thereafter, every time the mobile terminal MS similarly retransmits messages A (SEQ1(3)), A (SEQ1(4)), . . . once, other sequence numbers (SEQ2(2)), (SEQ2(3)), . . . are used to additionally transmit the message A having the same content in the steps 4k to 4n. This is shown in FIG. 6.

As described above, in the first embodiment, the handoff request additional transmission control function 132 is newly disposed. Moreover, according to the handoff request additional transmission control function 132, when the procedure shifts to the retransmission procedure of the handoff request message A, the usable sequence number (SEQ2) other than the sequence number (SEQ1) used in transmission of the message A is selected. Subsequently, this sequence number (SEQ2) is used to transmit the message A having the same content as that of the aforementioned message during a retransmission interval period of the message A using the sequence number (SEQ1).

Therefore, two different sequence numbers (SEQ1), (SEQ2) are used to transmit the handoff request messages A having the same content in parallel. Therefore, transmission frequency of the handoff request message A with respect to the base station BSa is enhanced. As a result, even in a state in which the radio environment is deteriorated with respect to the base station BSa, it is possible to quickly transmit the handoff request message A.

Moreover, in the first embodiment, the additional transmission of the handoff request message A having the same content is performed after shift to the retransmission procedure of the original handoff request message A. Therefore, when the radio environment is relatively satisfactory, and it is possible to notify the base station of the handoff request message before start of the retransmission procedure, only one sequence number may be used. Therefore, a limit number of sequence numbers can effectively be used.

Further in the first embodiment, when the sequence number for the additional transmission is selected, (e.g., one) sequence number prepared beforehand for transmission of another message is excluded. Therefore, a disadvantage that vacant sequence numbers are used up for transmission of one handoff request message A can be eliminated. Therefore, even when another message is simultaneously generated, the message can instantly be transmitted.

(Second Embodiment)

In a second embodiment of the present invention, during transmission of the handoff request message, the sequence number for the original message transmission and another sequence number for the additional transmission are selected, respectively, by the handoff request additional transmission control function. Moreover, the plurality of sequence numbers are used to transmit the handoff request messages having the same content at a time interval which is shorter than a retransmission interval from the start of the transmission.

Figure 7:
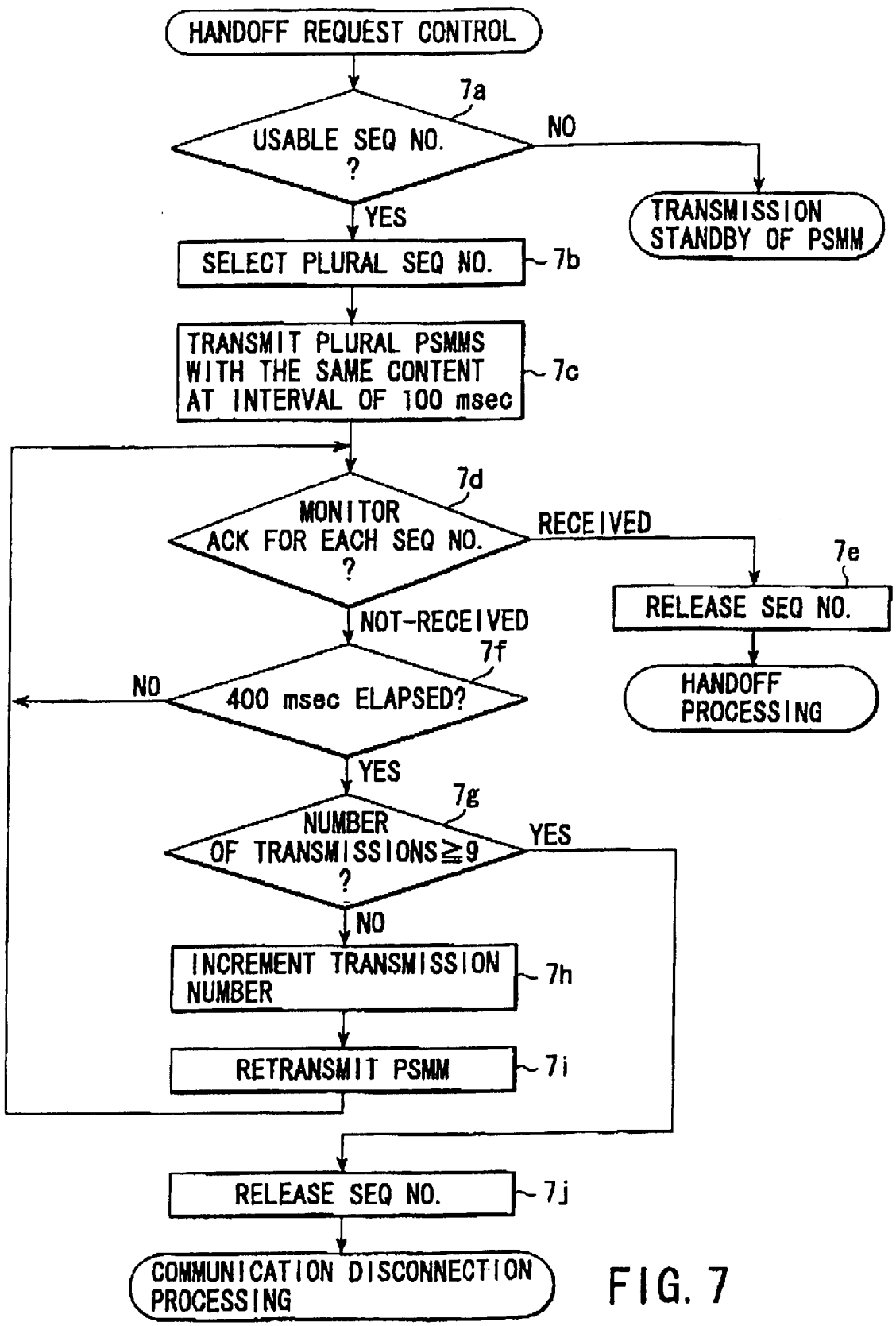
FIG. 7 is a flowchart showing a procedure of the handoff request control in a second embodiment of the present invention, and the content of the control.
Figure 8:
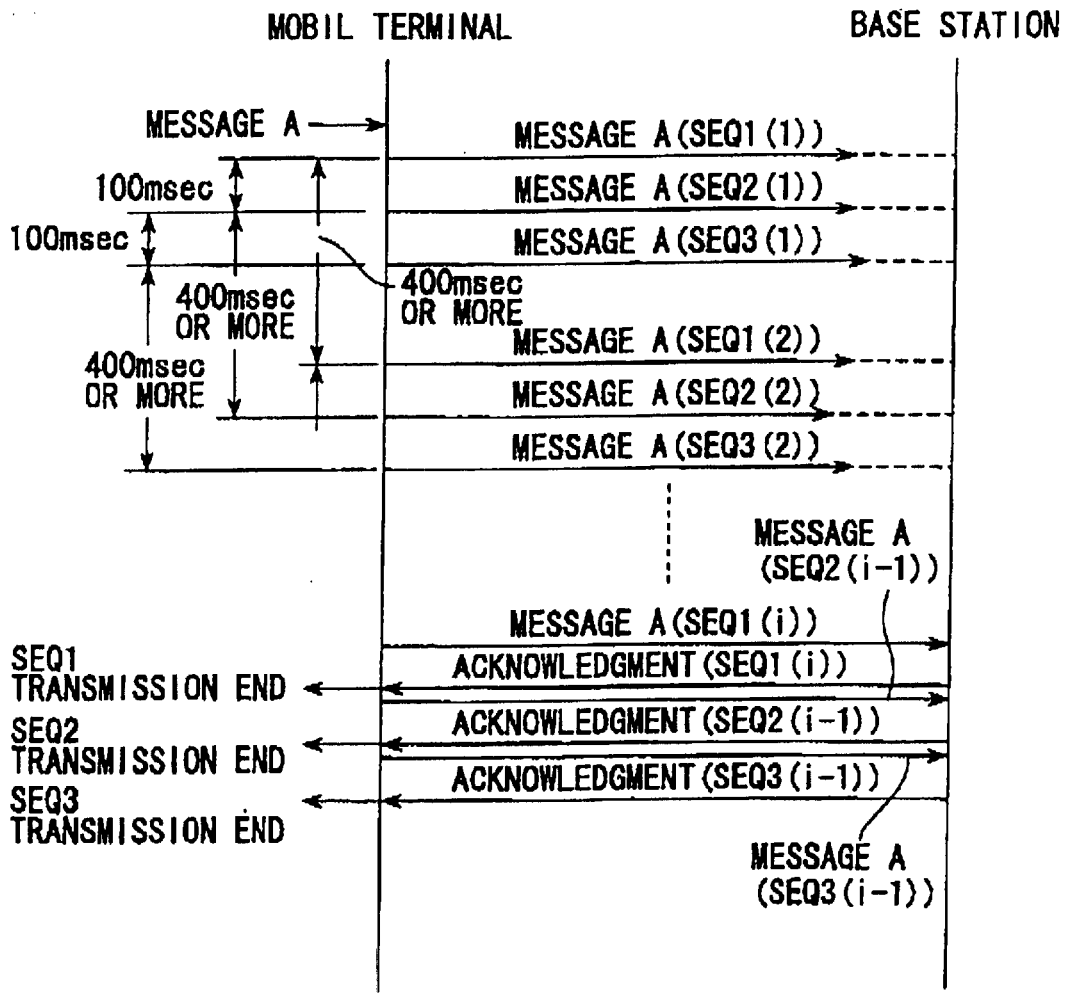
FIG. 8 is a sequence diagram showing the message transmission procedure in the second embodiment of the present invention.

FIG. 7 is a flowchart showing the procedure of the handoff request control of the mobile terminal MS and the content of the control according to the second embodiment, and FIG. 8 is a sequence diagram showing the message transmission procedure performed between the mobile terminal MS and the base station BS.

On shifting to the handoff request control, the mobile terminal MS determines first in step 7a whether or not there is the usable sequence number (SEQNo). Here, the usable sequence number means unused sequence numbers excluding, for example, one sequence number prepared beforehand for transmitting the message other than the handoff request message among a plurality of sequence numbers held by the system. As a result of the determination, when there is no usable sequence number, the processing shifts to the transmission standby control of the handoff request message.

On the other hand, when there are usable sequence numbers, in step 7b a plurality of usable sequence numbers are selected. For example, three sequence numbers (SEQ1), (SEQ2), (SEQ3) are selected. Additionally, when only one usable sequence number remains, the one sequence number is selected. Subsequently, in step 7c, the pilot strength measurement message (PSMM) is prepared as the message for requiring the handoff. In the pilot strength measurement message, the measured value of the reception strength of the pilot channel establishing the synchronization, and the measured values of the reception strengths of all the pilot channels from the neighboring and remaining base stations, obtained in the handoff determination control, are inserted.

Subsequently, the three sequence numbers (SEQ1), (SEQ2), (SEQ3) selected in the step 7b are used to transmit the prepared handoff request message A having the same content thereinafter referred to as the message A) to the base station BSa which is establishing the synchronization. Additionally, in this case, a transmission time interval of three messages A (SEQ1(1)), A (SEQ2(1)), and A (SEQ3(1)) is set to a value shorter than 400 msec as the message retransmission interval with use of one sequence number, for example, 100 msec.

When the three messages A (SEQ1(1)), A (SEQ2(1)), and A (SEQ3(1)) are transmitted, the mobile terminal MS starts the timer for each of the messages A (SEQ1(1)), A (SEQ2 (1)), and A (SEQ3(1)). Subsequently, while the time-out (40 msec) of the timer is monitored in step 7f, the return of the acknowledgment response message (ACK) from the base station BSa is monitored in step 7d. Moreover, when the acknowledgment response message is returned from the base station BSa before the time-out of the timer, the sequence number corresponding to the acknowledgment response message is released in step 7e, and subsequently the processing shifts to a handoff processing.

On the other hand, it is assumed that the state of the radio transmission path with the base station BSa is deteriorated, for example, by an influence of the mobile terminal MS and influence of multi-path. Moreover, the messages A (SEQ (1)), A (SEQ2(1)), and A (SEQ3(1)) do not reach the base station BSa, or the acknowledgment response message from the base station BSa cannot be received by the influences.

Then, the mobile terminal MS confirms the time-out of the timer in the step 7f, and shifts to step 7g. Then, it is determined in the step whether or not the retransmission of the messages A (SEQ(1)), A (SEQ2(1)), and A (SEQ3(1)) is possible. For example, when the number of transmissions of the message A is a predetermined number, for example, nine or less, the retransmission is determined to be possible. Subsequently, when the retransmission is possible, in step 7h, values of counters for counting the number of transmissions of the sequence numbers (SEQ1), (SEQ2), (SEQ3) are incremented to indicate (SEQ1(2)), (SEQ2(2)), (SEQ3(2)), respectively.

Subsequently, in step 7i, messages A (SEQ1(2)), A (SEQ2(2)), and A (SEQ3(2)) having the same contents as those of the messages A (SEQ1(1)), A (SEQ2(1)), and A (SEQ3(1)) are generated. Subsequently, as shown in FIG. 8, these messages A (SEQ1(2)), A (SEQ2(2)), and A (SEQ3(2)) are retransmitted to the base station BSa establishing the synchronization, while an interval of 100 msec is kept.

Thereafter, when the different sequence numbers (SEQ1), (SEQ2), (SEQ3) are used to retransmit the message A having the same content, the mobile terminal MS monitors the return of the acknowledgment response message from the base station BSa in the step 7d. Moreover, when the response message of acknowledgment cannot be received within the period (400 msec) before the time-out of the timer, the retransmission control of the message A by the steps 7d to 7i is repeated. This retransmission control ends at the time when the control is repeated the predetermined number of times, for example, nine times. Additionally, at the end of the retransmission procedure, the sequence numbers (SEQ1), (SEQ2), (SEQ3) are released in step 7p.

As described above, according to the second embodiment, the three different sequence numbers (SEQ1), (SEQ2), (SEQ3) are used to transmit the respective handoff request messages A having the same content at an interval of 100 msec from the start of the transmission. Therefore, the transmission frequency of the handoff request message A to the base station BSa is enhanced from the start of the transmission. Moreover, even when the state of the radio transmission path is deteriorated, the base station BSa can quickly be notified of the handoff request message A.

(Third Embodiment)

In a third embodiment of the present invention, a plurality of usable sequence numbers are selected in the retransmission procedure of the handoff request message A. Moreover, the selected plurality of sequence numbers are used to additionally transmit the message A having the same content as that of the message A at a time interval which is shorter than the retransmission interval. Furthermore, during the retransmission procedure of the message A including the additional transmission, when a handoff request message A' of the same type as the message A and having a new content is generated in the handoff determination control, the content of the message A to be retransmitted or additionally transmitted is updated to the content A' of the new message.

Figure 9:
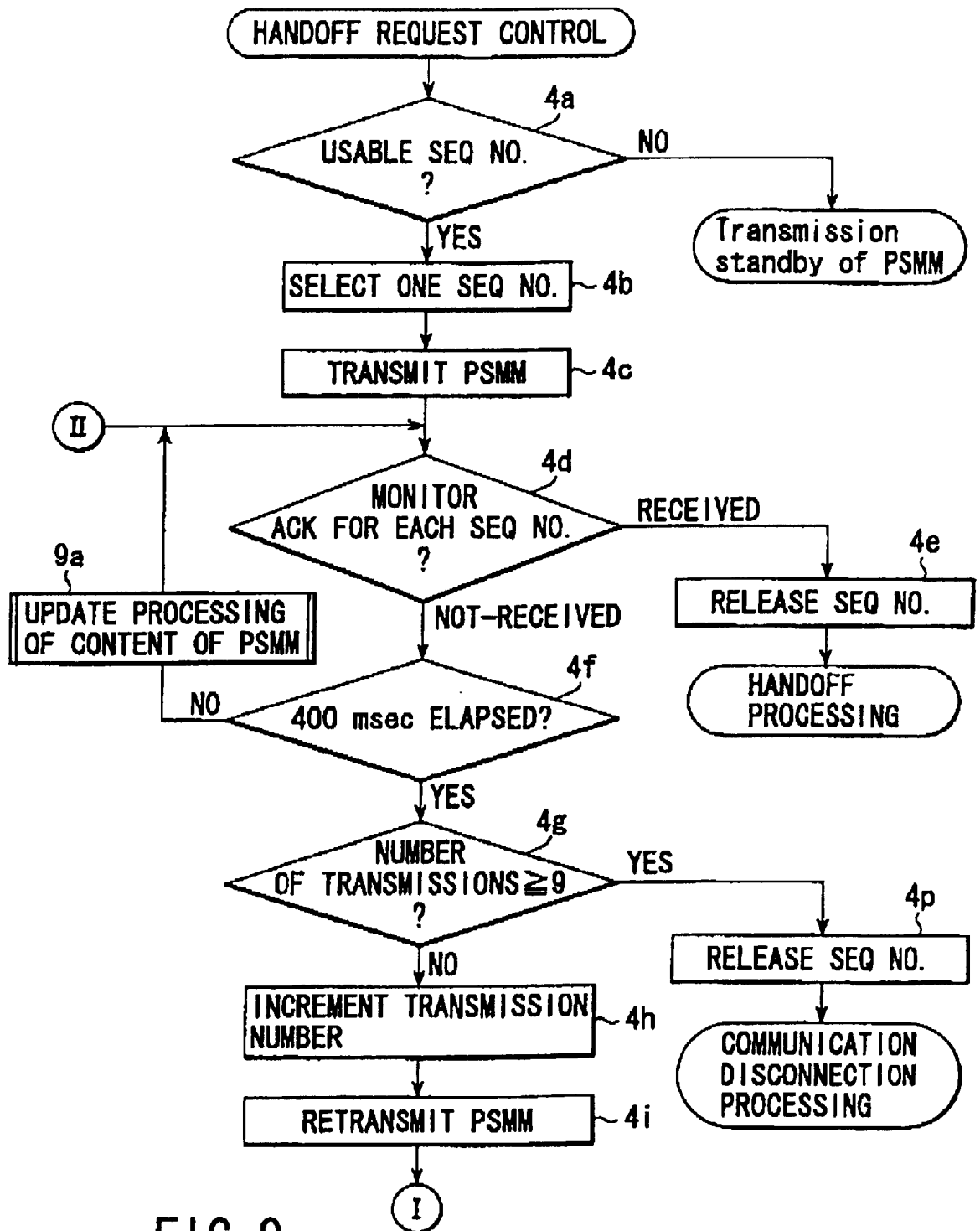
FIG. 9 is a flowchart showing a procedure of the handoff request control in a third embodiment of the present invention, and the content of the control.
Figure 10:
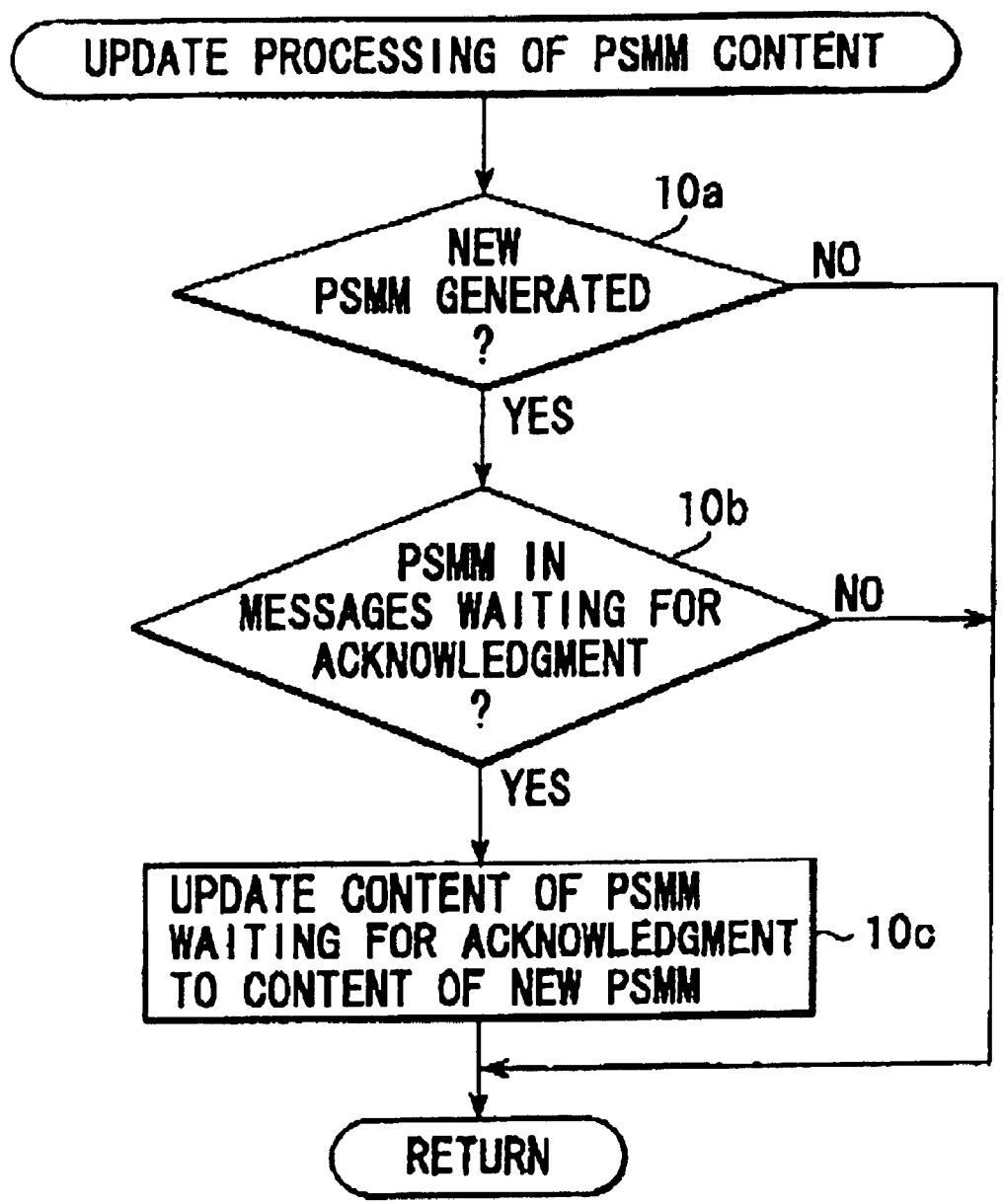
FIG. 10 is a flowchart showing a procedure of a message content update processing of the handoff request control in the third embodiment of the present invention, and the content of the processing.
Figure 11:
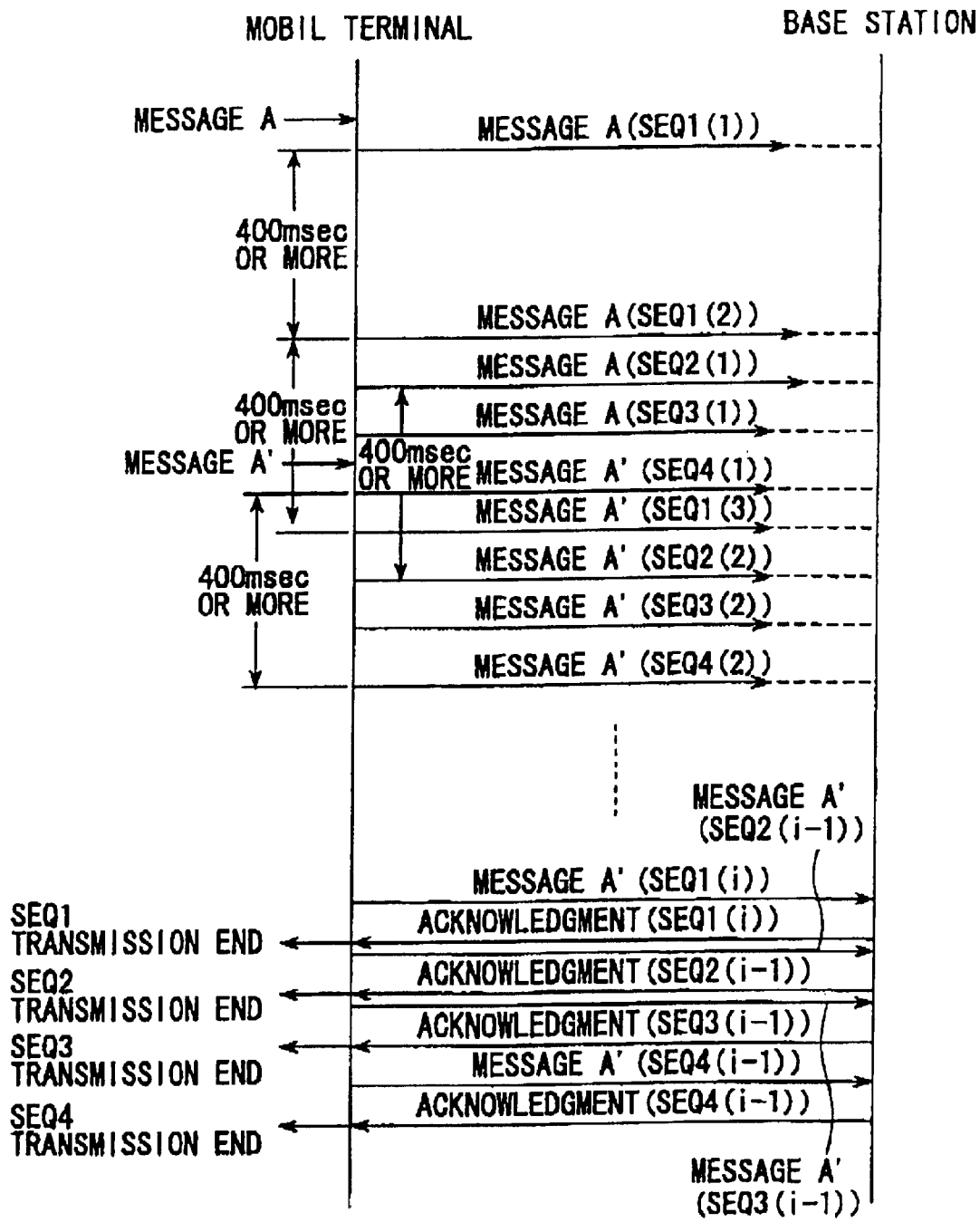
FIG. 11 is a sequence diagram showing the message transmission procedure in the third embodiment of the present invention.
Figure 12:
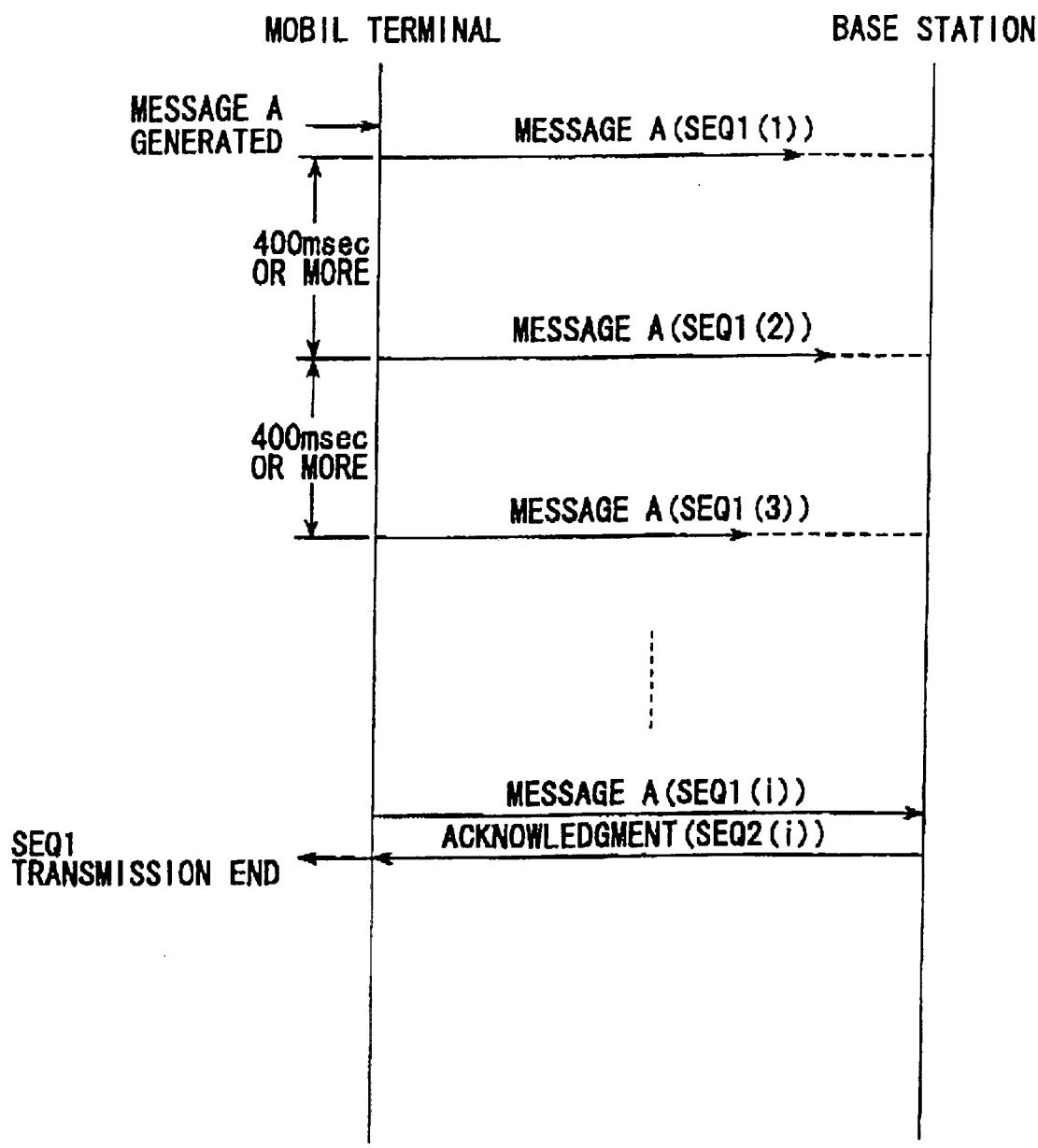
FIG. 12 is a sequence diagram showing a conventional transmission procedure of a handoff request message.

FIGS. 9 and 10 are flowcharts showing the procedure of the handoff request control of the mobile terminal MS and the content of the control according to the third embodiment, and FIG. 11 is a sequence diagram showing the message transmission procedure performed between the mobile terminal MS and the base station BS. Additionally, in FIG. 9 the same part as that of FIG. 4 is denoted with the same reference numerals, and detailed description thereof is omitted. Moreover, since the additional transmission processing subsequent to the step 4i of FIG. 9 is the same as that of FIG. 5, depiction thereof is omitted.

In a period for monitoring arrival of the acknowledgment response message after transmission or retransmission of the handoff request message A, the mobile terminal MS performs a content update processing of the request message (PSMM) in step 9a.

That is, the mobile terminal MS monitors in step 10a shown in FIG. 10 whether or not a new handoff request message is generated by the handoff determination control. With generation of the new handoff request message in this state, it is determined in step 10b whether or not there is the same type of message as the new handoff request message in the handoff request messages waiting for the acknowledgment response. As a result of the determination, when there is the same type of message, next in step 10c the content of the same type of the handoff request message waiting for the acknowledgment response is updated to the content of the new handoff request message.

Therefore, when the handoff request message A waiting for the acknowledgment response is retransmitted after the time-out of the state waiting for the acknowledgment response, the handoff request message A' having the content updated is retransmitted. The content update processing is, as shown in FIG. 11, similarly performed with respect to not only the original handoff request message A using the sequence number (SEQ1), but also the handoff request message A which has the same content and is additionally transmitted using the other sequence numbers (SEQ2), (SEQ3).

As described above, according to the third embodiment, the handoff request message A' of the same type as the handoff request message A waiting for the acknowledgment response is newly generated. In this case, the content of the handoff request message A waiting for the acknowledgment response is all updated to the content of the message A', even when the message A is the original message or the additionally transmitted message. Moreover, in the subsequent retransmission procedure of the handoff request message, the message A' having the updated content is retransmitted.

Therefore, similarly as the first and second embodiments, the mobile terminal MS can frequently transmit the handoff request message having the same content to the base station BSa. Additionally, the latest pilot strength measured value can constantly be transmitted. Therefore, when the state of the radio transmission path is even temporarily recovered, the base station BSa can quickly receive any one of the frequently transmitted messages. Additionally, the handoff destination can be determined based on the latest pilot strength measured value, and optimum handoff is therefore constantly possible.

(Other Embodiments)

In the first to third embodiments, the CDMA mobile communication system has been described as the example. However, this is not limited. When the mobile terminal has a function of transmitting the handoff request in the system, the system can similarly be applied to a system employing time division multiple access (TDMA) methods such as personal digital cellular (PDC) and personal handyphone system (PHS).

Furthermore, the example for transmitting the handoff request message has been described in the respective embodiments. However, the present invention can be applied to transmission of other types of messages as long as the message requires the response of acknowledgment.

Moreover, communication link connection control, communication control and handoff control function for transmission and reception may be realized by a control circuit constituted of gate array and other integrated circuits instead of the microprocessor.

Additionally, the type and circuit constitution of the mobile terminal, handoff determination control, procedure and content of the handoff request control and message additional transmission control, procedure and content of the message update processing, and the like can also be modified and implemented variously within the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A mobile communication terminal apparatus comprising:
   measuring means for measuring respective reception qualities of radio signals transmitted from a first base station and a second base station disposed in a periphery of the first base station while synchronization is established with the first base station;
   handoff determining means for determining whether or not handoff is necessary based on a measurement result of said measuring means;
   message generating means for generating a first handoff request message if the handoff determining means determines the handoff to be necessary;
   first selecting means for selecting a usable first sequence number from a plurality of sequence numbers;
   message transmitting means for transmitting the first handoff request message generated by said message generating means with the selected first sequence number to said first base station;
   response monitor means for monitoring whether or not an acknowledgment response arrives from said first base station within a predetermined period from a transmission timing of said handoff request message;
   message retransmitting means for retransmitting said first handoff at least once with the selected first sequence number if the acknowledgment response does not arrive from the first base station within said predetermined period;
   second selecting means for selecting a usable second sequence number from said plurality of sequence numbers; and
   message additional transmitting means for transmitting a second handoff request message with the selected second sequence number, the second handoff request message having the same content as that of the first handoff request message transmitted by said message transmitting means to said first base station.

2. The mobile communication terminal apparatus according to claim 1, wherein said message additional transmitting means performs additional transmission of said second handoff request message during a first period from when said message transmitting means transmits the first handoff request message until said message retransmitting means retransmits the first handoff request message.

3. The mobile communication terminal apparatus according to claim 1, wherein said message additional transmitting means additionally transmits said second handoff request message during a second period from when said message retransmitting means retransmits the first handoff request message until the next retransmission of the first handoff request message is performed.

4. The mobile communication terminal apparatus according to claim 1, wherein said second selecting means determines whether or not there are a plurality of usable sequence numbers in said plurality of sequence numbers, and selects the plurality of usable sequence numbers if any, and
   said message additional transmitting means transmits the second handoff request message with each of the selected sequence number, the handoff request message having the same content as that of the first handoff request message transmitted by said message transmitting means a plurality of times.

5. The mobile communication terminal apparatus according to claim 4, wherein said message additional transmitting means transmits said second handoff request message a plurality of times during a period from when said message transmitting means transmits the first handoff request message until said message retransmitting means retransmits the first handoff request message.

6. The mobile communication terminal apparatus according to claim 4, wherein said message additional transmitting means additionally transmits said second handoff request message a plurality of times during a period from when said message retransmitting means retransmits the first handoff request message until the next retransmission of the first handoff request message is performed.

7. The mobile communication terminal apparatus according to claim 4, wherein said second selecting means selects some of the plurality of usable sequence numbers reserves a predetermined number of usable sequence numbers as spares from said other than the selected sequence numbers of plurality of sequence numbers.

8. A control circuit comprising:
   measuring means for measuring respective reception qualities of radio signals transmitted from a first base station and a second base station disposed in a periphery of the first base station while synchronization is established with the first base station;
   handoff determining means for determining whether or not handoff is necessary based on a measurement result of the measuring means;
   message generating means for generating a first handoff request message if the handoff determining means determines the handoff to be necessary;
   first selecting means for selecting a usable first sequence number from a plurality of sequence numbers;
   message transmission instructing means for instructing a transmission circuit to said first selecting means and transmit the first handoff request message generated by said message generating means with the selected first sequence number to said first base station;
   response monitor means for monitoring whether or not an acknowledgment response arrives from said first base station within a predetermined period from a transmission timing of said handoff request message;
   message retransmission instructing means for instructing said transmission circuit to retransmit said first handoff request message with the selected first sequence number, if the acknowledgment response does not arrive within said predetermined period;
   second selecting means for selecting a usable second sequence number from said plurality of sequence numbers; and message additional transmission instructing means for instructing said transmission circuit to transmit a second handoff request message having the same content as that of the first handoff request message transmitted by said message transmitting means with the selected second sequence number to said first base station.

9. The control circuit according to claim 8, wherein said message additional transmission instructing means instructs the transmission circuit to additionally transmit said second handoff request message during a first period from when said message transmission instructing means instructs transmission of the first handoff request message until said message retransmission instructing means instructs retransmission of the first handoff request message.

10. The control circuit according to claim 8, wherein said message additional transmission instructing means instructs said transmission circuit to additionally transmits said second handoff request message during a second period from when said message retransmission instructing means instructs retransmission of the first handoff request message until the next retransmission of the first handoff request message is instructed.

11. The control circuit according to claim 8, wherein said second selecting means determines whether or not there are a plurality of usable sequence numbers in said plurality of sequence numbers, and selects the plurality of usable sequence numbers if any, and said message additional transmission instructing means instructs said transmission circuit to transmit the second handoff request message with each of the selected sequence numbers, the second handoff request message having the same content as that of the first handoff request message transmitted by said message transmission instructing means a plurality of times.

12. The control circuit according to claim 11, wherein said message additional transmission instructing means instructs said transmission circuit to additionally transmit said second handoff request message a plurality of times during a first period from when said message transmission instructing means instructs transmission of the first handoff request message until said message retransmission instructing means instructs retransmission of the first handoff request message.

13. The control circuit according to claim 11, wherein said message additional transmission instructing means instructs said transmission circuit to additionally transmit said second handoff request message a plurality of times during a second period from when said message retransmission instructing means instructs retransmission of the first handoff request message until the next retransmission of the first handoff request message is instructed.

14. The control circuit according to claim 11, wherein said second selecting means reserves a predetermined number of usable sequence numbers as spares from said plurality of sequence numbers, and selects the plurality of usable sequence numbers.

15. A handoff control method comprising steps of:

measuring respective reception qualities of radio signals transmitted from a first base station and a second base station disposed in a periphery of the first base station while synchronization is established with the first base station;

determining whether or not handoff is necessary based on a measurement result of said reception quality;

generating a first handoff request message if the handoff is determined to be necessary;

selecting a usable first sequence number from a plurality of sequence numbers;

transmitting said generated first handoff request message with the selected first sequence number to said first base station;

monitoring whether or not an acknowledgment response arrives from said first base station within a predetermined period from a transmission timing of said first handoff request message;

retransmitting said first handoff request message with the first sequence number, if the acknowledgment response does not arrive within said predetermined period;

selecting a usable second sequence number from said plurality of sequence numbers; and transmitting a second handoff request message with the selected second sequence number, the second handoff request message having the same content as that of said transmitted first handoff request message to said first base station.

16. A mobile communication terminal apparatus connectable to a base station over a radio channel, comprising:

message generating means for generating a first message for requiring a predetermined processing of said base station;

first selecting means for selecting a usable first sequence number from a plurality of sequence numbers;

first message transmitting means for transmitting the first message generated by said message generating means with the selected first sequence number to said base station;

second selecting means for selecting a usable second sequence number from said plurality of sequence numbers; and second message transmitting means for transmitting a second message with the selected second sequence number, the second message having the same content as that of said first message to said base station at a timing which is different from a transmission timing of said first message.

17. A control circuit included in a mobile communication terminal apparatus connectable to a base station over a radio channel, comprising:

message generating means for generating a first message for requiring a predetermined processing of said base station;

first selecting means for selecting a usable first sequence number from a plurality of sequence numbers;

first message transmission instructing means for instructing a transmission circuit to transmit the first message generated by said message generating means with the selected first sequence number to said base station;

second selecting means for selecting a usable second sequence number from said plurality of sequence numbers; and second message transmission instructing means for instructing said transmission circuit to transmit a second message with the selected second sequence number, the second message having the same content as that of said first message to said base station at a timing which is different from a transmission timing of said first message.

18. A message transmission method for transmitting a message to a base station from a mobile communication terminal apparatus over a radio channel, comprising steps of:

generating a first message for requiring a predetermined processing of said base station;

selecting a usable first sequence number from a plurality of sequence numbers;

transmitting said generated first message with the selected first sequence number to said base station;

selecting a usable second sequence number from said plurality of sequence numbers; and transmitting a second message with the selected second sequence number, the second message having a same content as that of said first message to said base station at a timing which is different from a transmission timing of said first message.

19. A mobile communication terminal apparatus connectable to a base station over a radio channel, comprising:

message generating means for generating a first message for requiring a predetermined processing of said base station;

first selecting means for selecting a usable first sequence number from a plurality of sequence numbers;

first message transmitting means for transmitting the first message generated by said message generating means with the selected first sequence number to said base station;

response monitor means for monitoring whether or not an acknowledgment response arrives from said base station within a predetermined period from a timing of transmission of said first message;

message retransmitting means for retransmitting said first message with the selected first sequence number, if the acknowledgment response does not arrive from the base station within said predetermined period;

second selecting means for selecting a usable second sequence number from said plurality of sequence numbers; and second message transmitting means for transmitting a second message with the selected second sequence number, the second message having the same content as that of said first message to said base station at a timing which is different from transmission and retransmission timings of said first message.

20. A control circuit included in a mobile communication terminal apparatus connectable to a base station over a radio channel, comprising:

message generating means for generating a first message for requiring a predetermined processing of said base station;

first selecting means for selecting a usable first sequence number from a plurality of sequence numbers;

first message transmission instructing means for instructing a transmission circuit to transmit the first message generated by said message generating means with the selected first sequence number to said base station;

response monitor means for monitoring whether or not an acknowledgment response arrives from said base station within a predetermined period from a timing of transmission of said first message;

message retransmission instructing means for retransmitting said first message with the selected first sequence number, if the acknowledgment response does not arrive from the base station within said predetermined period;

second selecting means for selecting a usable second sequence number from said plurality of sequence numbers; and second message transmission instructing means for instructing said transmission circuit to transmit a second message with the selected second sequence number, the second message having the same content as that of said first message to said base station at a timing which is different from transmission and retransmission timings of said first message.

21. A message transmission method for transmitting a message to a base station from a mobile communication terminal apparatus over a radio channel, comprising steps of:

generating a first message for requiring a predetermined processing of said base station;

selecting a usable first sequence number from a plurality of sequence numbers;

transmitting said generated first message with the selected first sequence number to said base station;

monitoring whether or not an acknowledgment response arrives from said base station within a predetermined period from a timing of transmission of said first message;

retransmitting said first message with the selected first sequence number, if the acknowledgment response does not arrive from the base station within said predetermined period;

selecting a usable second sequence number from said plurality of sequence numbers; and transmitting a second message with the selected second sequence number, the second message having the same content as that of said first message to said base station at a timing which is different from transmission and retransmission timings of said first message.

* * * * *